United States Patent
Kalkan et al.

(10) Patent No.: US 10,494,491 B2
(45) Date of Patent: Dec. 3, 2019

(54) METHOD FOR FABRICATION OF HIGH DISPERSION POLYMER NANOCOMPOSITES

(71) Applicant: THE BOARD OF REGENTS FOR OKLAHOMA STATE UNIVERSITY, Stillwater, OK (US)

(72) Inventors: Ali Kaan Kalkan, Stillwater, OK (US); Sriharsha Karumuri, Stillwater, OK (US); Linqi Zhang, Stillwater, OK (US)

(73) Assignee: The Board of Regents for Oklahoma State University, Stillwater, OK (US)

(*) Notice: Subject to any disclaimer, the term of this patent is extended or adjusted under 35 U.S.C. 154(b) by 0 days.

(21) Appl. No.: 15/543,698

(22) PCT Filed: Jan. 19, 2016

(86) PCT No.: PCT/US2016/013922
§ 371 (c)(1),
(2) Date: Jul. 14, 2017

(87) PCT Pub. No.: WO2016/115570
PCT Pub. Date: Jul. 21, 2016

(65) Prior Publication Data
US 2017/0369658 A1    Dec. 28, 2017

Related U.S. Application Data

(60) Provisional application No. 62/104,413, filed on Jan. 16, 2015.

(51) Int. Cl.
| | |
|---|---|
| C08K 7/06 | (2006.01) |
| C08J 5/00 | (2006.01) |
| B82Y 30/00 | (2011.01) |
| C08G 69/26 | (2006.01) |
| C08G 69/16 | (2006.01) |
| C08L 67/02 | (2006.01) |
| C08K 3/08 | (2006.01) |

(52) U.S. Cl.
CPC .............. *C08J 5/005* (2013.01); *B82Y 30/00* (2013.01); *C08G 69/16* (2013.01); *C08G 69/26* (2013.01); *C08K 7/06* (2013.01); *C08L 67/02* (2013.01); *C08J 2367/02* (2013.01); *C08K 2003/0806* (2013.01); *C08K 2201/011* (2013.01)

(58) Field of Classification Search
CPC .......... C08J 5/005; C08G 69/16; C08G 69/26; C08K 7/06; C08L 67/02; B82Y 30/00
USPC ...................................................... 523/200
See application file for complete search history.

(56) References Cited

U.S. PATENT DOCUMENTS

| | | | | |
|---|---|---|---|---|
| 7,829,624 B2* | 11/2010 | Warren | ................. | C08F 257/02 |
| | | | | 524/505 |
| 9,068,056 B2 | 6/2015 | Tvai et al. | | |
| 2003/0104218 A1* | 6/2003 | Tsai | ........ | C08L 71/00 |
| | | | | 428/423.5 |
| 2005/0019574 A1* | 1/2005 | McCrary | .................. | C09C 3/10 |
| | | | | 428/403 |
| 2005/0191490 A1* | 9/2005 | Ton-That | ............... | B82Y 30/00 |
| | | | | 428/407 |
| 2006/0122284 A1 | 6/2006 | Rodriguez-Macias et al. | | |
| 2009/0140284 A1 | 6/2009 | Kurino et al. | | |
| 2009/0146339 A1* | 6/2009 | Malone | ................... | B29C 47/14 |
| | | | | 264/211.23 |
| 2010/0210745 A1 | 8/2010 | McDaniel et al. | | |
| 2010/0320417 A1* | 12/2010 | Yadav | .................... | B01J 12/005 |
| | | | | 252/182.33 |
| 2012/0061625 A1* | 3/2012 | Eckert | ...................... | C09D 5/24 |
| | | | | 252/514 |
| 2012/0065312 A1 | 3/2012 | Ishibara et al. | | |
| 2013/0313483 A1 | 11/2013 | Mace et al. | | |

(Continued)

FOREIGN PATENT DOCUMENTS

| | | |
|---|---|---|
| CN | 102191003 A1 | 9/2011 |
| JP | 2014224199 A | 12/2014 |
| WO | WO2013056845 A2 | 4/2013 |

OTHER PUBLICATIONS

PCT/US2016/013922, The Board of Regents for Oklahoma State University, "Method for Fabrication of High Dispersion Polymer Nanocomposites", Publication No. WO 2016/115570 A1 on Jul. 21, 2016, International Search Report and Written Opinion.

*Primary Examiner* — Hannah J Pak
(74) *Attorney, Agent, or Firm* — McAfee & Taft (57) ABSTRACT

The present invention includes the efficient dispersion and high loading of fillers in a thermoplastic polymer matrix. In a first general embodiment, the present invention includes a method wherein fillers are first synthesized and dispersed in a liquid monomer. The liquid monomer is then polymerized to a solid. The nanofillers may be silver nanoparticle/nanowire fillers. Ethylene glycol may serve as a solvent, reducing agent as well as precursor monomer for polymerization. In a second general embodiment, the present invention includes a method wherein fillers may be separately synthesized (or obtained commercially) and then added and dispersed in a liquid monomer. The liquid monomer is then polymerized to a solid. In a third general embodiment, a composite is synthesized using interfacial polycondensation. This is accomplished by aggressive mixing of two solvents during the reaction. The aggressive mixing forms microdroplets (i.e., emulsion) and hence dramatically increases the interface area thereby to a much faster polymerization rate.

10 Claims, 9 Drawing Sheets

(56) References Cited

U.S. PATENT DOCUMENTS

2014/0262454 A1 9/2014 Zou et al.
2014/0356524 A1* 12/2014 Gao ..................... H01B 1/02
427/126.1

* cited by examiner

(i) Addition of fillers to monomer/solvent (ii) Suspended fillers in monomer/solvent (iii) Polymerization of solvent/monomer with fillers

*Figure 4(c)*

(i) Addition of fillers to polymer precursor 1

(ii) Suspended fillers in polymer precursor 1
(iii) Addition of polymer precursor 2

(iv) Polycondensation of precursors

AgNWs in THF 1,6-diaminohexane in water

METHOD FOR FABRICATION OF HIGH DISPERSION POLYMER NANOCOMPOSITES

CROSS REFERENCE TO RELATED APPLICATIONS

This application claims the benefit of U.S. Provisional Patent Application Ser. No. 62/104,413 filed on Jan. 16, 2015, and incorporates said provisional application by reference into this document as if fully set out at this point.

TECHNICAL FIELD

This disclosure relates generally to the field of polymer science, generally, and specifically, the synthesis of composites and nanocomposites.

BACKGROUND

A common challenge confronted in fabrication of polymer composites/nanocomposites is the efficient dispersion and high loading of fillers (nanofillers) in a thermoplastic.

Recent innovations in the field of polymer science and nanotechnology have led to the development of polymer nanocomposites. With incorporation of micro and nanoscale fillers of metals and metal oxides in regular polymer matrices improved functionalities, such as strength, toughness, wear resistance, fire retardance, and conductivity can be gained.

However, a common challenge confronted in fabrication of polymer composites/nanocomposites is the efficient dispersion of fillers/nanofillers in the thermoplastic. In a conventional practice, the thermoplastic is heated to a viscous melt and the nanofillers are dispersed in it by shear mixing. In this mixing process, the nanofillers have essentially zero diffusion in the viscous polymer matrix. In principle, the viscosity can be reduced at higher temperatures, but most thermoplastics are subject to rapid oxidation (i.e., combustion) at their melting temperatures, already. Inefficient dispersion of nanofillers results in aggregates, which then behave as micron-sized or larger particles. Consequently, the benefits inherent to nanoscale are lost, including high surface to volume ratio.

Alternatively, it is possible to take advantage of efficient dispersion of fillers/nanofillers in a solvent due to the unrestricted diffusion of micro/nanostructures in solvents. This approach allows efficient dispersion of the nanofillers in a polymer once that polymer is dissolved in the solvent. However, the desired polymer must be soluble in the same solvent as that of the nanofillers. Therefore, if the nanofillers are synthesized by solution chemistry, their solvent must be exchanged with a proper solvent, which also dissolves the polymer. This step is typically carried out by centrifuging or dialysis. Next, the polymer must be dissolved in the solvent. Depending on the polymer and solvent, the solution process may take from hours to days requiring heating and stirring. Finally, the solvent must be extracted by vacuum filtering or evaporation.

Therefore, although the approach of 'solvent dispersion plus extraction' works, it involves a number of arduous steps. Further, the use of solvents may be costly and involve health hazards. A need therefore exists for a method of fabrication of high dispersion polymer nanocomposites that can be conducted in an efficient manner that minimizes waste of costly solvents.

Before proceeding to a description of the present invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

The present invention teaches a system and method of efficient dispersion and high loading of fillers (micro and nanofillers) in a thermoplastic polymer matrix. In general, an embodiment teaches a method wherein the filler can be first synthesized and dispersed efficiently in a liquid monomer, which can then be polymerized to a solid. In a second general embodiment, a separately prepared or obtained suitable filler can be dispersed into the liquid monomer from a solid (typically powder) stock, which can then, likewise, be polymerized to a solid.

It should be understood by one of skill in the art that the methods of the present disclosure are not dependent on the type of filler. As long as the liquid monomer disperses the fillers, any filler will potentially work. The filler surface may be modified by a surfactant or capping agent to improve dispersion. Moreover, if polyol-mediated filler synthesis is desired, due to its properties and economies, silver is a particularly suitable filler which has been used in the below examples. However, it should be understood that the methods of the present disclosure are not limited to silver (Ag) fillers but the synthesis or the addition of a wide range of "fillers" are contemplated. Accordingly, as used herein, the term "filler" or "fillers" may include various microparticles or nanoparticles, most suitably of coinage metals, transition metals, metal oxides, and chalcogenides, without limitation. Similarly, the "filler" can be a metal, semiconductor (Si, Ge, CdS, CdSe, CdTe, iron oxides, etc.) or insulator (zirconia, titania, alumina, etc.). The "filler" may be of any suitable category or shape, such as spherical (or substantially spherical), granular, tubular (such as nanotubes), rod-shaped, wire-shaped, sheet-shaped, platelet-shaped multifaceted, or quantum dots. As set forth, the monomer may be used for filler synthesis in one general embodiment, or the filler can by synthesized (and/or obtained) independently and separately from the monomer and added to the monomer prior to polymer synthesis in a second general embodiment. As such, in this second general embodiment, one of skill in the art would recognize that the liquid monomer does not have to be used for filler synthesis. Although non-metallic "fillers", such as carbon nanomaterials, cannot be synthesized using polyol process, ethylene glycol (or any polyol) is contemplated and suited to be employed as a solvent/monomer for "filler" dispersion. For example, in this second general embodiment, the suitable fillers can be dispersed into the liquid monomer from a powder (solid) stock. In this second general embodiment the nanopowder/micropowder "filler" may alternatively be carbon based consisting of graphene, graphene oxide, carbon nanotubes, bucky balls ($C_{60}$) or other Fullerenes or carbon black. Typically, dispersion is achieved by ultrasonication.

In a particular embodiment, an example practice of the first general method of the present disclosure is synthesis of Polyethylene Terephthalate (PET) nanocomposite with silver nanoparticle/nanowire (collectively "Ag NWs" herein) fillers. The Ag nanofillers are first synthesized in ethylene glycol ("EG") by the polyol process, where silver nitrate (AgNO$_3$) is reduced by EG. Next, the ethylene glycol is polymerized to PET by condensation polymerization using terephthalic acid. Hence, EG serves as the solvent, reducing agent as well as the precursor monomer for the polymerization. The whole process can be conducted in the same chamber. None of the chemicals need be disposed or wasted.

In an example of a second general embodiment, the AgNW fillers may be separately synthesized or obtained commercially and added to EG solvent/monomer. The EG is then polymerized to PET by condensation polymerization using terephthalic acid. Some example practices of the present method are described in detail below.

According to another embodiment there is provided a method of fabricating high dispersion polymer filler, said method comprising: synthesizing and/or dispersing a filler in a first liquid monomer; and, polymerizing said liquid monomer.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the method and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

FIG. 4 depicts the process of the present disclosure wherein (a) depicts a monomer used for filler synthesis and then the solution is polymerized; (b) depicts an alternate wherein the filler is dissolved in at least one monomer/solvent and then the solution(s) is/are polymerized; (c) depicts another alternate wherein the filler is dispersed in a first precursor into which at least one other precursor is added and then polycondensation occurs.

DETAILED DESCRIPTION

The present invention includes the efficient dispersion and high loading of fillers in a thermoplastic polymer matrix. One aspect of this disclosure teaches a technique for the efficient and low-cost dispersion of fillers in a thermoplastic polymer.

Figure 4A:
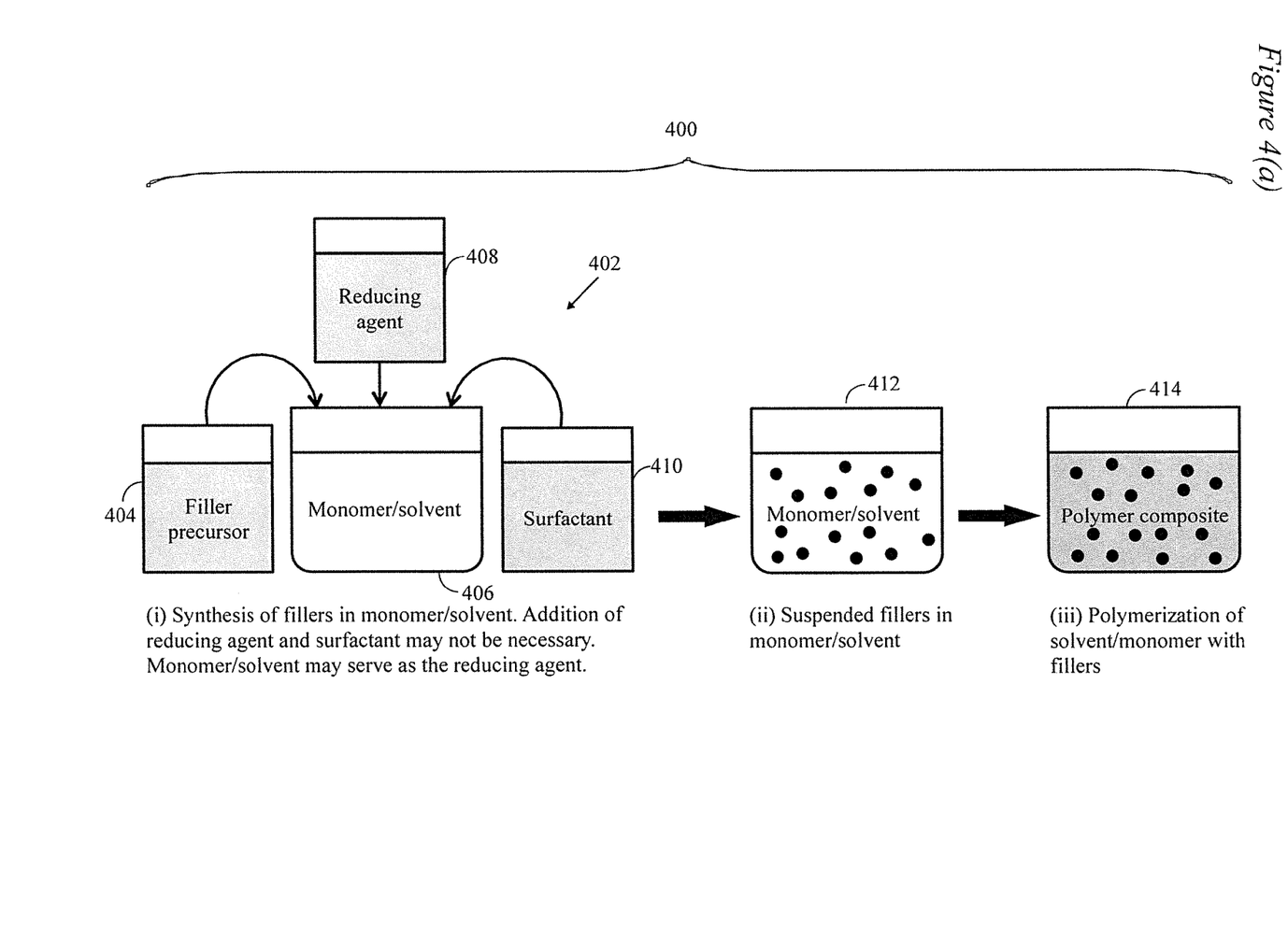

With reference to FIG. 4(a), in a first general embodiment, the present disclosure includes a method 400 wherein fillers are first synthesized and dispersed in at least one liquid monomer. The liquid monomer is then polymerized to a solid. As shown, a filler precursor 404 is added to a monomer/solvent 406 in a first step 402. The fillers may be silver nanoparticle/nanowire fillers for example. Ethylene glycol (EG) may serve as a solvent, reducing agent as well as precursor monomer for polymerization. Alternatively or additionally, in a specific application or when a different solvent/monomer other than EG is employed such as other polyols or diamine or lactum or a combination thereof, without limitation. In certain applications, a separate reducing agent 408 or surfactant 410 may be added to the monomer/solvent 406 may be beneficial. Once filler precursor 404 is added to monomer/solvent 406 (as well as reducing agent 408 and/or surfactant 410 if applicable), the filler is formed and dispersed in the monomer/solvent at 412. According to this embodiment, polycondensation and dispersion of the filler(s) occur simultaneously. Because the polymer precursors are dissolved in a low viscosity solution, the fillers are efficiently dispersed (i.e., suspension) prior to polymerization. The filler surface may be modified by surfactant 410 or other suitable capping agent to improve dispersion. As the polymerization proceeds at 414, the fillers get entrapped in the solid polymer, but they remain highly monodispersed.

Figure 4B:
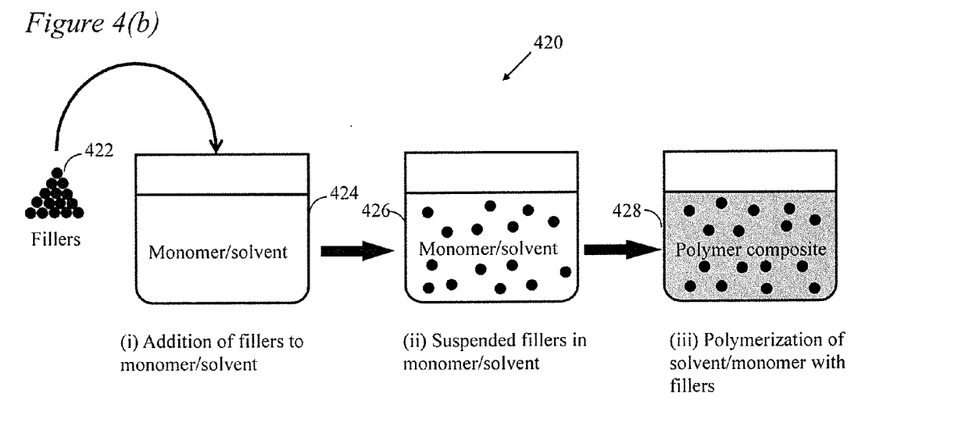

In a second general embodiment as depicted in FIG. 4(b), the present disclosure includes a method 420 wherein a filler or multiple fillers 422 may be separately synthesized (or obtained commercially) and then added and dispersed in a liquid monomer/solvent 424. The filler(s) are then dispersed and suspended in the monomer/solvent at 426. The liquid monomer is then polymerized to a solid at 428.

Figure 4C:
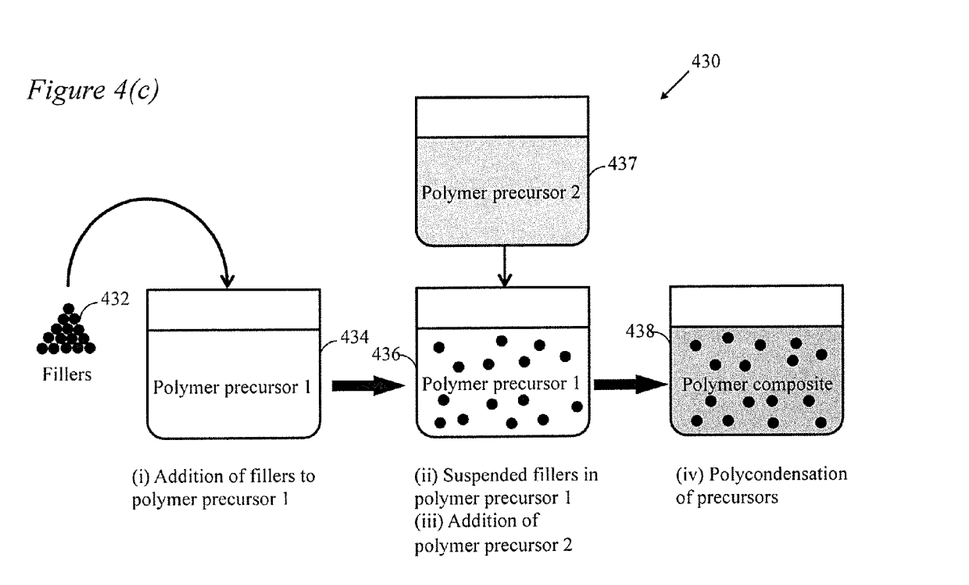

In a third general embodiment as depicted in FIG. 4(*c*), the present disclosure includes a method 430 wherein filler(s) 432 may be separately synthesized (or obtained commercially) and then added to a polymer precursor 1 at 434. Fillers 432 are dispersed in polymer precursor 1 at 436. In this embodiment, a second polymer precursor 2 437 may be added to the dispersion of filler(s) and polymer precursor 1 at 436 to form a mixture. Interfacial polycondensation of the mixture then occurs at 438. This is accomplished by aggressive mixing of the two solvents 436 and 437 during the polycondensation reaction. The aggressive mixing disperses one (nonpolar) solvent in the other (polar) solvent in the form of an emulsion and hence dramatically increases the interface area leading to a much faster polymerization rate.

In a particular embodiment, further described in Example 4 below, the present disclosure demonstrates the synthesis of a silver nanowire—Nylon 66 (AgNW/N66) composite using interfacial polycondensation. Interfacial polycondensation is a well-established polymerization technique which takes place at the interface between two mutually immiscible solvents. Typically, one is polar dissolving a polar monomer, the other is nonpolar dissolving a nonpolar monomer. The two monomers react at the interface accounting for the condensation polymerization reaction.

In a typical process, it is known that polar monomer can partially dissolve the nonpolar solvent while the nonpolar monomer is essentially not soluble in the polar solvent. Therefore, the reaction is believed to occur effectively in the nonpolar solvent but at close proximity of the interface. The polymer product accumulating at the interface in the form of a thin film has to be simultaneously removed because it would otherwise block the monomer diffusion to the interface from polar to nonpolar side.

A major aspect of the present disclosure, then, is the incorporation of fillers (such as AgNWs) to the polymer during polycondensation. In a particular embodiment, the AgNWs are synthesized by the polyol process and capped with polyvinylpyrollidone (PVP), a polar polymer. It is shown that the AgNWs are efficiently dispersed in N66 at room temperature.

Another aspect of the developed technique/method of the present disclosure is aggressive mixing of the two solvents by a vortexer during the reaction rather than keeping a static and flat interface between them. This can be accomplished by, for example, a high speed vortexing technique, typically operated at about 1,000-3,000 rpm, which employs vibrational motion to accomplish satisfactory mixing. That being said, those of ordinary skill in the art will recognize that the vortexing parameters may need to be altered depending on the constituent materials, etc.

The aggressive mixing disperses the nonpolar solvent in the polar solvent in the form of microdroplets (i.e., emulsion) and hence dramatically increases the interface area between the two domains leading to a much faster polymerization rate. It is found that N66 polymerizes in the form of microspheres with AgNWs entrapped in them. Once the condensation reaction is complete, the AgNW-dispersed N66 microspheres are centrifuged and dried to microparticles, which are subsequently molten and cast into a mold to achieve high filler content bulk nanocomposite without the need for any shear mixing. Accordingly, the following terminology will be adopted for purposes of the instant disclosure: Nanocomposites by Dynamic Emulsion Polycondensation (NCDEP).

According to an embodiment, to effectively disperse a filler or fillers (such as AgNWs) in polymer matrix, the AgNW filler can be dissolved in one of the monomers and polymerize the solution. Matrices of polyesters, polyamides, and polyurethanes around AgNW fillers can be synthesized in this method. In this section, the process of fabricating nanocomposites with matrices of polyester, polyamide, and polyurethane is elucidated.

EXAMPLE 1

Fabrication of AgNW-PET Nanocomposites

Figure 1:
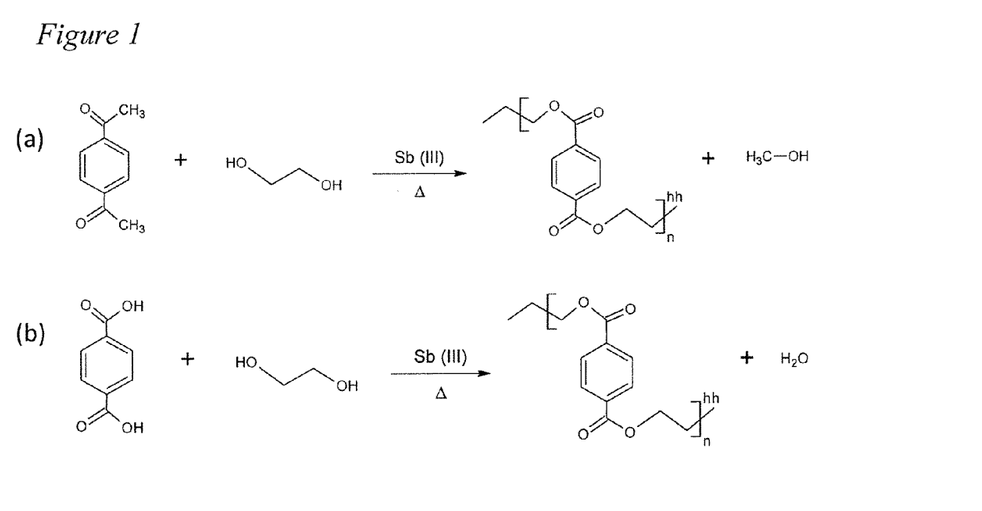
FIG. 1 contains an exemplary diagram which illustrates the polycondensation reaction. Reaction (a) shows the synthesis of PET from DMT and EG, while reaction (b) shows the synthesis of PET from TPA and EG.

Polyesters are Synthesized from Alcohol and Carboxylic Acid or Esters Monomers by condensation polymerization reaction. For example, PET can be synthesized from ethylene glycol (EU) by condensation reaction with either terephthalic acid (TPA) or dimethyl terephthalate (DMT) in presence of catalysts (such as $Sb_2O_3$, zinc acetate, manganese acetate) as shown in FIGS. 1*a* and *b*. In the polycondensation reactions, ester links are formed between ethylene and terephthalate by generating water or methanol as byproduct during polymerization of EG and TPA or DMT, respectively. In order to eliminate depolymerization and oxidation of PET, the synthesis is carried in an oxygen free environment.

In one embodiment, a nanosilver-PET composite is synthesized by adding DMT into an EG solution, in which Ag nanofillers are already synthesized by the polyol process. This solution mixture is initially heated to between approximately 180 to 220° C. (greater than boiling point of EG). After appropriate amount of methanol is generated, the mixture is polymerized in presence of antimony (Sb) and triphenyl phosphite. In the following stage of polymerization, the obtained mixture is heated to between approximately 250 to 280° C. in vacuum or nitrogen environment. The Ag-PET nanocomposite can also be synthesized using TPA instead of DMT. The TPA+EG+nanofiller mixture is heated to 265° C. in presence of antimony (III) oxide in nitrogen purged environment, which is followed by further heating at low vacuum at 280° C. FIG. 1 contains an exemplary diagram which illustrates a polycondensation reaction. Reaction (a) of FIG. 1 shows the synthesis of PET from DMT and EG. Reaction (b) of FIG. 1 shows the synthesis of PET from TPA and EG.

PET is known for its exceptional mechanical strength. As such, it is used in the manufacture of carpets and water bottles. PET with Ag nanoparticle/nanowire fillers can be used to block sunlight in plastic bottles (water, beverages, medicine) or food containers. Further, nanofillers improve the elastic modulus and strength. In particular, when PET pellets containing Ag nanowire fillers are extruded to fibers, the nanowires are expected to align with the fiber axis due to the shear forces. Hence, superior mechanical reinforcement can be achieved. The fibers can be used to weave solar shades with superior strength and shading properties. The fabrics will also have antibacterial and antistatic characteristics. The nanocomposite pellets can also be used in injection molding of various objects. The nanofillers are not limited to Ag. It will be understood by one of skill in the art that other metal nanofillers, such as, but not limited to, Au and Cu nanostructures can be synthesized by the polyol process or similar, as known by one of skill in the art.

EXAMPLE 2

Fabrication of AgNW-polyamide Nanocomposites

Figure 2:
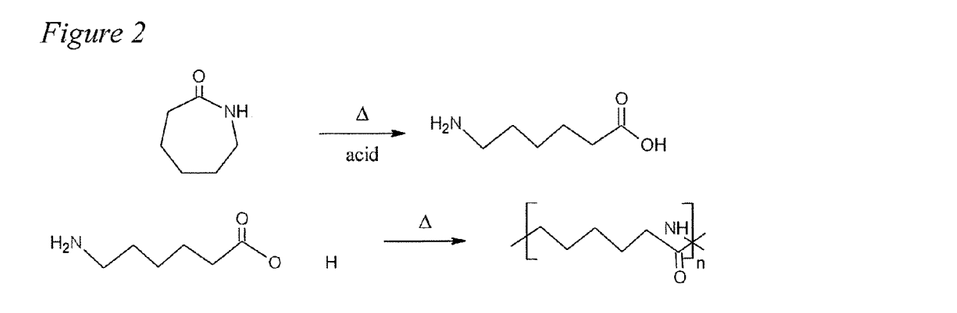
FIG. 2 shows an exemplary reaction that shows the synthesis of Nylon 6 from ε-caprolactam.
Figure 3:
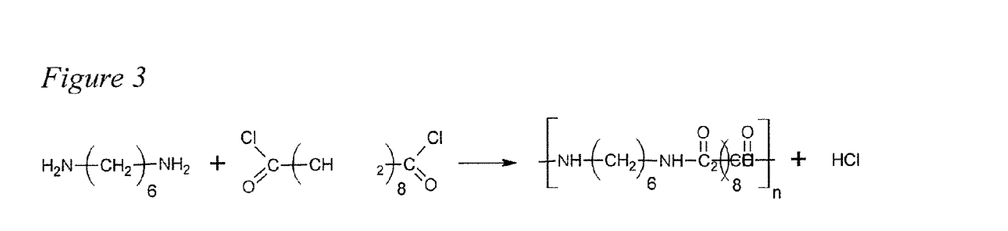
FIG. 3 shows an exemplary reaction sequence that shows the synthesis of nylon 6/10 from interfacial polycondensation reaction.

By replacing EG as solvent for AgNWs with diamine or lactam solvent using centrifugation, polyamide matrix in AgNWs nanocomposites may be fabricated in an alternate embodiment. This replaced solvent serves as monomers in formation of polyamides. Lactams are used as monomers in fabricating nylon by ring opening polymerization which is similar to chain growth polymerization. Nylon 6 is commonly synthesized from ε-caprolactam by ring opening polymerization whose chemical reaction is shown in FIG. 2. Initially, ε-caprolactam is replaced as solvent in AgNWs by centrifugation and n-aminocaproic acid is added to the mixture to initiate polymerization. After initiation stage, the mixture is heated in the nitrogen environment at a temperature range of between approximately 240 to 250° C. In addition, diamine solvent of AgNWs can be polymerized with diacid halide into polyamides in a process known as interfacial polycondensation reaction. For example, synthesized polyamides such as nylon 6/6 or nylon 6/10 are achieved using this method. In this method, AgNWs are dissolved in water along with diamine (1,6-hexamethylene diamine). To the obtained mixture of AgNWs solution, diacid halide (sebacoyl chloride) was dissolved in toluene and mixed to AgNWs solution. This obtained mixture is stirred to initiate polymerization at room temperature. After vigorous mixing of the prepared solution generates nylon 6,10 suspension because of the chemical reaction shown in FIG. 3.

EXAMPLE 3

Fabrication of AgNW-polyurethane Nanocomposite

Polyols and isocyantes can also be polymerized to form polyurethane. As AgNWs are synthesized in EG, EG may be employed as a monomer in fabricating polyethylene glycol or polyethylene oxide (PEG or PEO). These polymers are extensively used in medicine or biological applications. In addition, these polymers are blended with polyurethanes to improve their flexibility. Further, EG may be replaced in other applications with higher polyols using centrifuging process to synthesize other types of polyurethanes.

EXAMPLE 4

Ag/Nylon Nanocomposites by Dynamic Emulsion Polycondensation

In this example, the fillers are Ag nanowires (AgNWs) synthesized by polyol synthesis. This example further describes vortex-mixing of the nanowires with two liquid monomers to form a dynamic emulsion. Under these conditions, polycondensation of Nylon 66 (N66) occurs with uniformly dispersed nanowires and a nanocomposite is synthesized in the form of microparticles. Next, the microparticles are separated from the liquid and dried. Finally, the obtained nanocomposite powder is molten and molded to solid objects. This example provides the detailed procedures and characterization results for proof of concept, that is, a AgNW/N66 nanocomposite with well-dispersed nanofillers is indeed achieved without the need for any shear mixing.

In polyol synthesis of AgNWs, AgNO3 is used as the source of silver ions, Ag+, which are reduced by ethylene glycol (EG) at 170° C. EG also serves as the solvent. The nanowires are washed and purified by centrifugation after the synthesis. It should be understood by one of skill in the art that the invention is not limited to AgNWs synthesized by the polyol process. Other fillers (microfillers or nanofillers) and other filler manufacturing approaches may be adopted. For example, fillers may be purchased commercially in colloidal or powder form and used as received. Alternatively, fillers may be purchased in colloidal or powder form and modified with a surfactant or capping agent so that they can be well-dispersed in the liquid monomers.

Although the polyol synthesis of AgNWs is known in the art, the process details taken in this example are described here. Here, 4.995 g of polyvinylprrolidone (PVP, MW=55, 000, Sigma-Aldrich) is dissolved in 100 ml of ethylene glycol (EG) by vortex mixing for 2 min and stored in a plastic bottle with air tight seal for at least one day before use to make sure the PVP is completely dissolved. Next, 5 g of AgNO3 is dissolved in 245 ml of EG at a concentration of 0.12 M. The AgNO3 solution is stored in an amber glass bottle in the refrigerator. After preparation, the solution is kept for at least one day before use. Subsequently, 20 ml of the PVP solution (in EG) is transferred to a 100 ml flask. The flask is pre-cleaned by DI water (50%)+isopropyl alcohol (IPA) (50%) mixture and ultra-sonicated for 1 h. The flask is then blow-dried by argon. Next, 28 mg of NaCl was added into the flask containing PVP dissolved in EG. The solution is ultra-sonicated for 2 min to dissolve the solid NaCl. Then, the flask is placed in a heating mantle having both heating and magnetic stirring capabilities. A condenser is assembled on the neck of the flask with cold water running from the bottom to the top. The condenser is supported by an iron stand.

Prior to the initiation of Ag reduction, the PVP solution is kept at 170° C. for 1 h under continuous stirring using a star-head magnetic stir bar (0.68"×0.56") at 1000 rpm. The solution temperature is monitored by a liquid thermometer. Subsequently, AgNW reduction is initiated by dropwise addition of 0.12 M AgNO3 into the PVP solution by Era NE-300 syringe pump at a rate of 20 ml/h. The injection is continued for 1 h. After AgNO3 injection is complete, the resulting nanowire suspension is further stirred at 170° C. for 30 min. Finally, the suspension is air-cooled to room temperature.

AgNW suspension prepared by polyol process contains excess PVP. In order to remove the excess PVP and transfer the AgNWs into water, the suspension is dispersed in acetone+ethanol and centrifuged.

Figure 5:
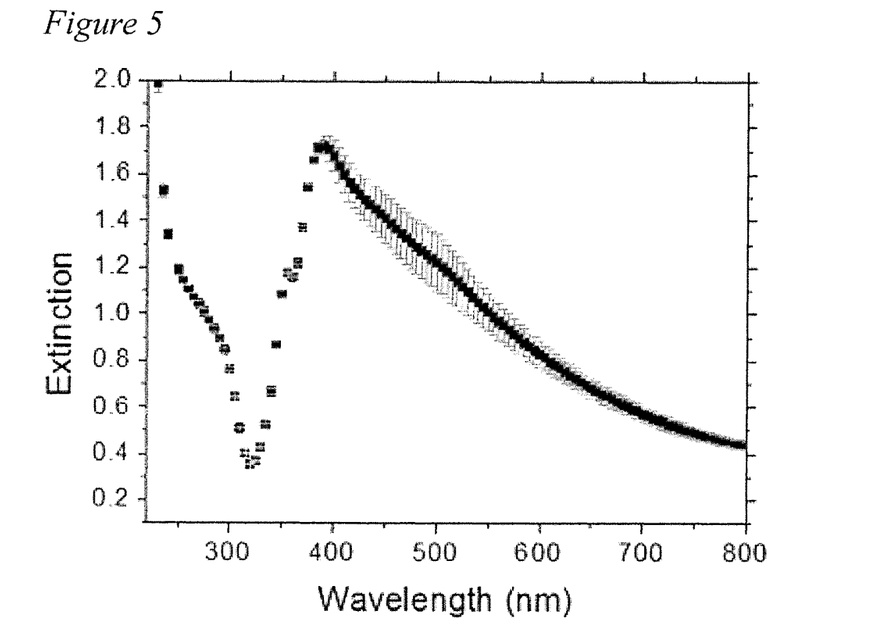
FIG. 5 depicts an average optical extinction spectrum of the filler composite of Example 4 of the present disclosure after eight (8) batches with error bars.

Five ml of AgNW suspension is put in a centrifuge tube and diluted 5 times by acetone and centrifuged twice at 3,500 rpm for 30 min. After the first centrifugation, three different layers formed. The supernatant is acetone. The middle layer being yellow is the excess PVP, which is removed by a pipette. Silver nanowires are separated from the suspension in the form of a precipitate. Subsequently, the supernatant is removed and the precipitate is dispersed in 30 ml of acetone and again centrifuged at 3500 rpm for 30 min. Next, the nanowires are dispersed in ethanol and centrifuged at 3500 rpm for 30 min. After three centrifugations, AgNWs are characterized by UV-Vis spectroscopy (FIG. 5) and the extinction spectrum is checked to assure reproducibility.

Figure 6:
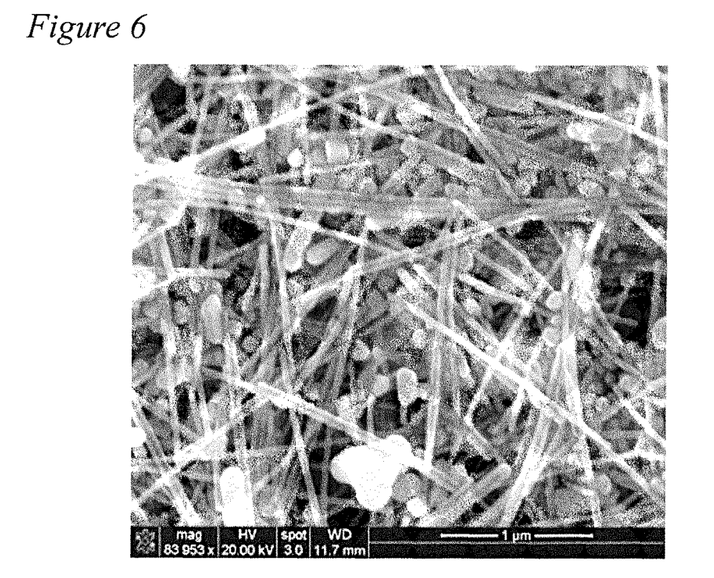
FIG. 6 is a scanning electron microscope (SEM) image of the AgNW filler of Example 4 of the present disclosure synthesized by the polyol process of the present disclosure.

Morphology of the prepared AgNWs is checked by scanning electron microscopy (SEM). The SEM image in FIG. 6 shows that the AgNWs are 5-10 urn long and have diameter of 43±15 nm. The image also shows the presence of Ag nanoparticles and nanorods in addition to nanowires.

The next step is polycondensation of Nylon 66 from liquid monomers together with the AgNWs to form the nanocomposite. This is the first inventive aspect of this demonstration. Second, the polycondensation of Nylon 66 disclosed in this example also consists of inventive steps. With the objective of clarifying these inventive steps and distinguish them from the prior art, it is beneficial first to discuss conventional interfacial polycondensation of Nylon 66.

The conventional polycondensation reaction of Nylon 66 employs two monomers: 1,6-diaminohexane dissolved in water and adipoyl chloride dissolved in nonpolar organic solvent. A protonated amide is formed as soon as the two solutions are mixed and a clear interface between water and the nonpolar solvent forms in a container. The proton is rapidly eliminated and combines with Cl— forming HCl. The polymer forms near the interface but at the organic solvent side, because adipoly chloride is essentially not soluble in water while the diaminohexane is partially soluble in the organic solvent. Therefore, acylation reaction occurs in the organic solvent close to the interface. Accumulation of the polymer product at the interface prevents diaminohexane transport and limits the reaction. Hence, in order to maintain polycondensation, the polymer accumulating at the interface must be continuously removed.

Figure 7:
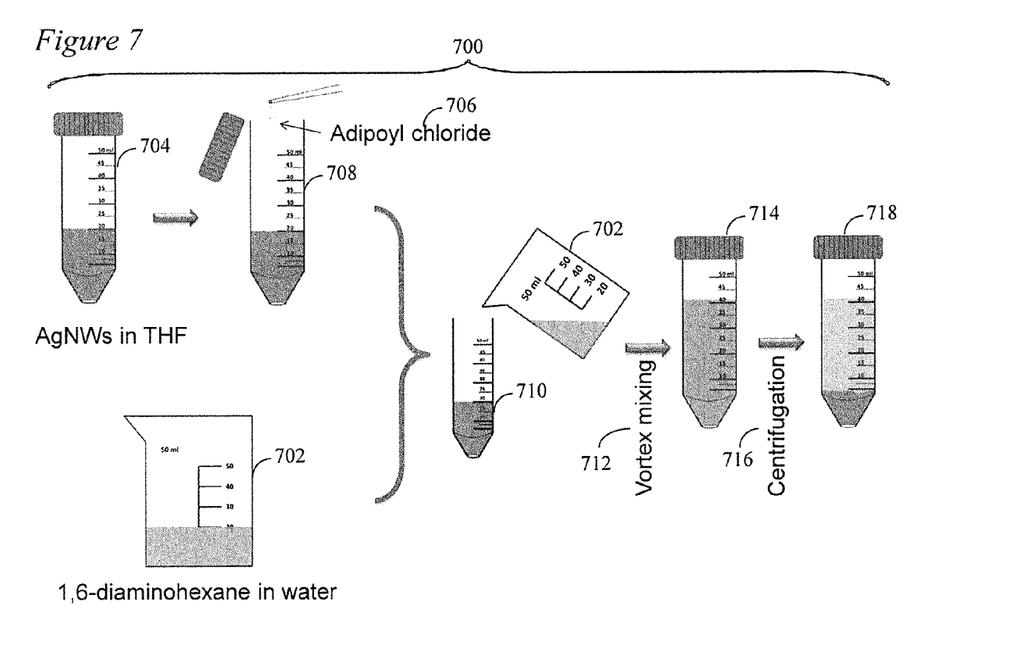
FIG. 7 is a schematic illustration of AgNW filler/N66 composite synthesis and separation of Example 4 of the present disclosure.

The procedures of AgNW/N66 composite synthesis and separation are illustrated in FIG. 7 including the details of the polycondensation of Nylon 66 in this example with the fillers 700. In this example 700, 1,6-diaminohexane (98+%) and adipoyl chloride (98%) were purchased from Alfa Aesar. One Hundred g of 1,6-diaminohexane is dissolved in 1250 ml of water by stirring for 30 min using a magnetic stir bar (8×15.9 mm2) at 702. Next, AgNWs are dispersed in 120 ml of THF by vortex mixing for 5 min to form AgNW suspension. The AgNW suspension is stored in an amber bottle (not shown). Subsequently, 20 ml of this AgNW suspension is transferred to a 50 ml centrifuge tube at 704 and 1 ml of adipoyl chloride 706 (as received) is injected to the suspension using a pipette at 708. Next, 20 ml of 1.6-diaminohexane (previously prepared at 702 above) solution is added to the suspension at 710. The mixture is vortex-mixed at 3200 rpm for 10 s using a VWR Analog Vortex Mixer at 712. Polycondensation starts once 1.6-diaminohexane is added to the suspension and AgNW/N66 composite microparticles initiate to form 714. Centrifugation 716 may then be used to separate the synthesized AgNw/N66 composite microparticles as shown at 718.

An important aspect of the method of the present disclosure is aggressive mixing of the two solvents/monomers by a vortexer during the reaction rather than keeping a static and flat interface between them. The aggressive mixing basically disperses the nonpolar solvent in the polar solvent in the form of microdroplets (i.e., emulsion) and hence dramatically increases the interface area between the two domains leading to a much faster polymerization rate. If Polymerization using emulsions wherein stable emulsions including nonpolar domains are stabilized in polar solutions using surfactants, aggressive mixing may not be necessary. In contrast, a 'dynamic emulsion' is involved in this example of the present disclosure without the use of a surfactant. The emulsion can only form by aggressive mixing. The lack of surfactant allows a much faster transport at the interfaces leading to a faster polymerization rate. The polymer forms near the interface but at the organic solvent side, because adipoly chloride is essentially not soluble in water while the diaminohexane is partially soluble in the organic solvent. Therefore, acylation reaction occurs in the organic solvent close to the interface. On the other hand, the nonpolar (organic) domains are micron-sized and essentially they are at the effective thickness of the interface and hence polymerization can occur in the full body of the nonpolar domains (droplets). As such, it is found that N66 polymerizes in the form of microspheres with AgNWs entrapped in them. Hence, the polymerization is not self-limiting as in the case of interfacial polycondensation using flat interfaces.

After the completion of polycondensation, the AgNW/N66 composite microparticles were separated from the liquid and dried. The separation was achieved by centrifugation at 2,600 rpm for 10 min. After the centrifugation, supernatant was removed and the particles were dispersed in 30 ml of DI water by vortex mixing for 20 s. Subsequently, another centrifuge step was run as previously and the particles were transferred to a glass vial. Finally, the residual water was evaporated by placing the vial on a hot plate at 45° C. for 5 days.

Figure 8:
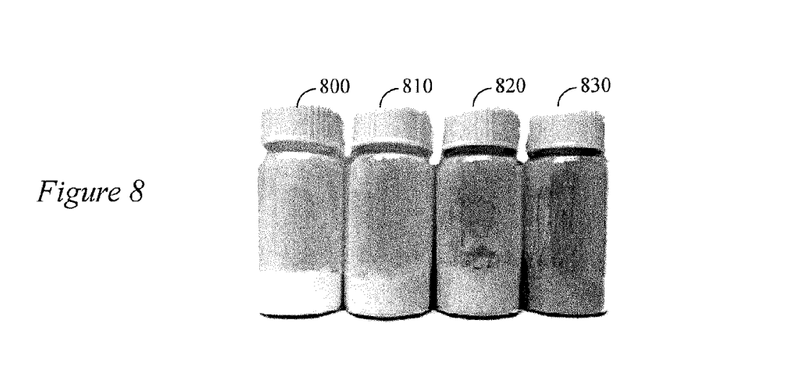
FIG. 8 depicts AgNW filler/N66 nanocomposite powder prepared according to the method of the present disclosure wherein the weight fraction of Ag from left to right is 0%, 1.49%, 3.28% and 6.74%, respectively.
Figure 9:
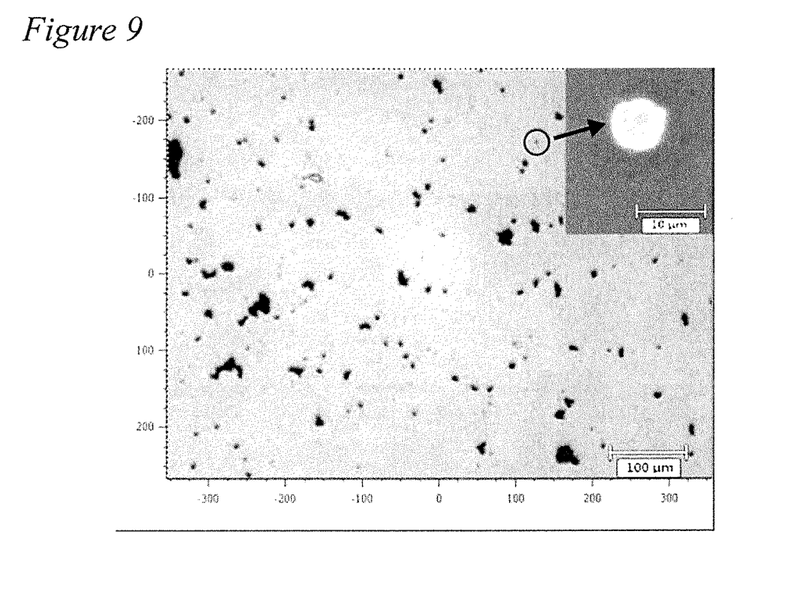
FIG. 9 is an optical microscope image of AgNW filler/N66 nanocomposite microparticles produced according to the method of the present disclosure in Example 4.

Representative AgNW/N66 particles are shown in FIG. 8. The weight fraction of Ag is depicted as 0% at 800; 1.49% at 810; 3.28% at 820; and, 6.74% at 830. Darkening of the color is observed when weight fraction of Ag is increased in the composite samples. The morphology of the microparticles was first investigated using an optical microscope in bright field (FIG. 9). The particle shape is found to be approximately spherical with an average diameter of 7 μm.

Figure 10:
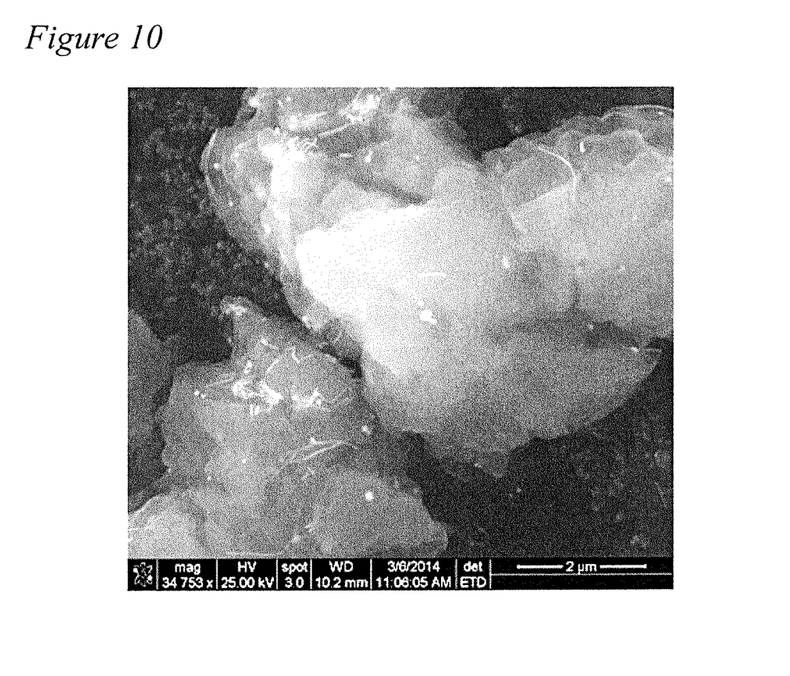
FIG. 10 is an SEM image of AgNW filler/N66 nanocomposite microparticles produced according to the method of the present disclosure in Example 4.

The morphology of the AgNW/N66 composite microparticles is further studied by SEM (FIG. 10). Insignificant amount of AgNWs as well as the AgNPs can be seen on the surface of the N66 microparticles. In addition, when polycondensation reaction was completed, the supernatant is transparent, implying no AgNWs were left in the supernatant. Therefore, it is verified that majority of the AgNWs are embedded in N66 during the polycondensation reaction.

Figure 11:
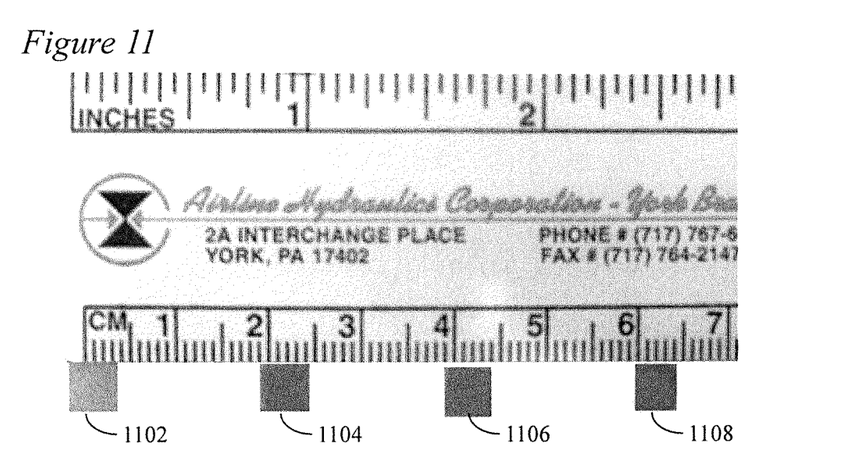
FIG. 11 shows AgNW filler/N66 samples prepared for characterization with nano-indentation wherein the Ag weight fraction from left to right is 0%, 1.49%, 3.28% and 6.74%, respectively.

After it is dried, the composite microparticles were transferred into a glass vial. The glass vial was sealed by an aluminum cap with a Teflon septum. Subsequently, the vial was purged with argon to minimize oxidation and lowered into a melter by glass wire. The nanocomposite powder sample was melted at 265° C. for 20 min and then cooled to room temperature. A K-type thermocouple was used to monitor the temperature. After solidification and cooling, the glass vial was broken to release the solid composite sample. For mechanical characterization of the samples of various AgNW content with nano-indentation, the samples were cut and ground into squares (4×4×1.3 mm3) as shown in FIG. 11. The Ag weight fraction of the samples is 0% in sample 1102; 1.49% in sample 1104; 3.28% in sample 1106; and, 6.74% in sample 1108.

Figure 12:
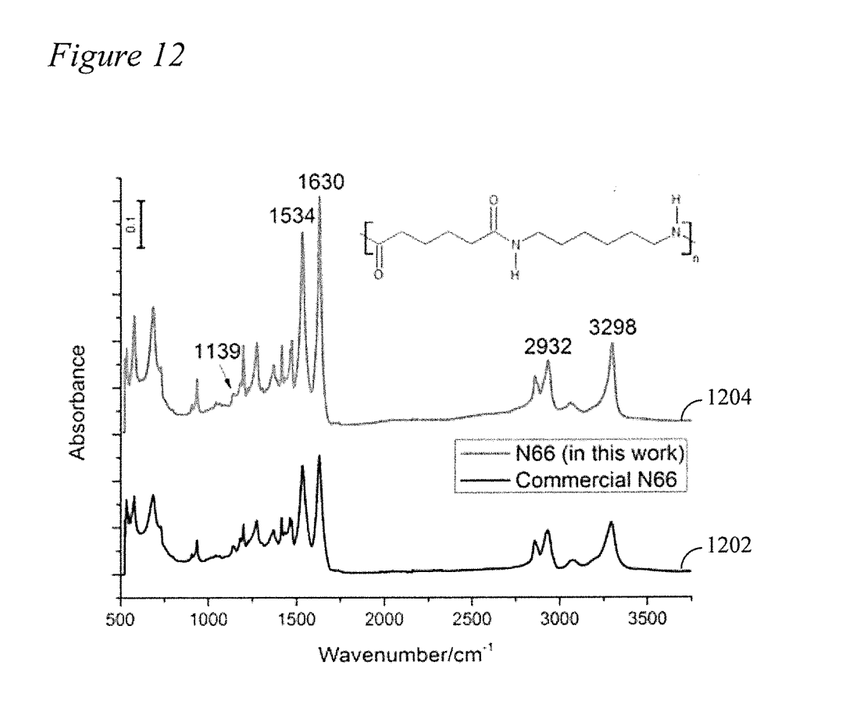
FIG. 12 depicts a fourier transform infrared (FTIR) spectra of commercial N66 compared with the N66 of the present disclosure.

AgNW/N66 nanocomposite microparticles are also characterized by FTIR spectroscopy. FTIR spectra of commercial N66 at 1202 and N66 at 1204 synthesized in the present demonstration are compared in FIG. 12. Assignments of FTIR peaks in the spectra of N66 are as follows. The peaks at 3298 and 2932 cm-1 are due to N—H and C—H stretching, respectively. The peaks at 1630 and 1534 cm-1 corresponds to C=O and C—N stretching. Finally, the peak at 1139 cm-1 is assigned to C—C stretching. The FTIR spectra of the commercial N66 and N66 of this demonstration are essentially the same.

Figure 13:
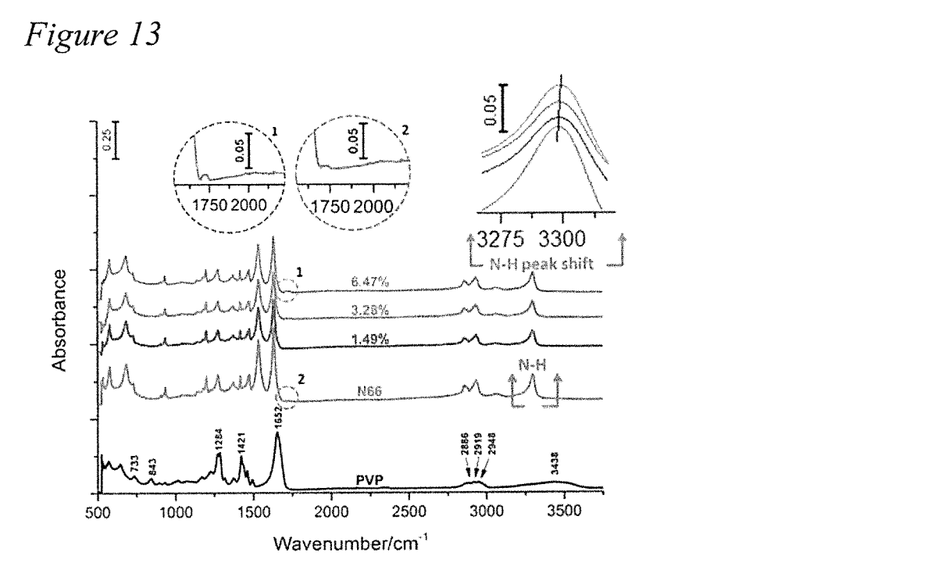
FIG. 13 depicts FTIR spectra of the PVP and the AgNW filler/N66 nanocomposite particles of the present disclosure.

FTIR spectra of the PVP and the AgNW/N66 composite particles are shown in FIG. 13. Assignments of the FTIR peaks in the spectra of PVP are as follows. The peak at 733 cm-1 corresponds to the C—C stretching in the backbone chain. The 843 cm-1 peak is assigned to C—C stretching in the pyrrolidone ring. The peak at 1248 cm-1 is due to C—N stretching. The peak at 1421 cm-1 corresponds to C—H bending. The peak at 1652 is assigned to C=O stretching. The peak at 2886 cm-1 is due to C—H stretching in the backbone chain. The peaks located at 2919 and 2948 cm-1 are assigned to C—H stretching in CH2 in the backbone chain and pyrrolidone ring, respectively. The peak located at 3446 cm-1 is due to O—H stretching vibration. It indicates the presence of hydroxyl groups in physisorbed water.

Next, the spectra of AgNW/N66 composites are examined. A systematic shift of the N—H stretching peak to higher wavenumbers with increasing Ag content (i.e., from 0 to 6.47 wt %) is observed. This frequency shift is attributed to the cleavage of the hydrogen bonds between N—H and C=O in N66 as AgNWs are introduced. As a result, the average stiffness of the N—H bonds increases, and the N—H peak exhibits higher energy shift.

Figure 14:
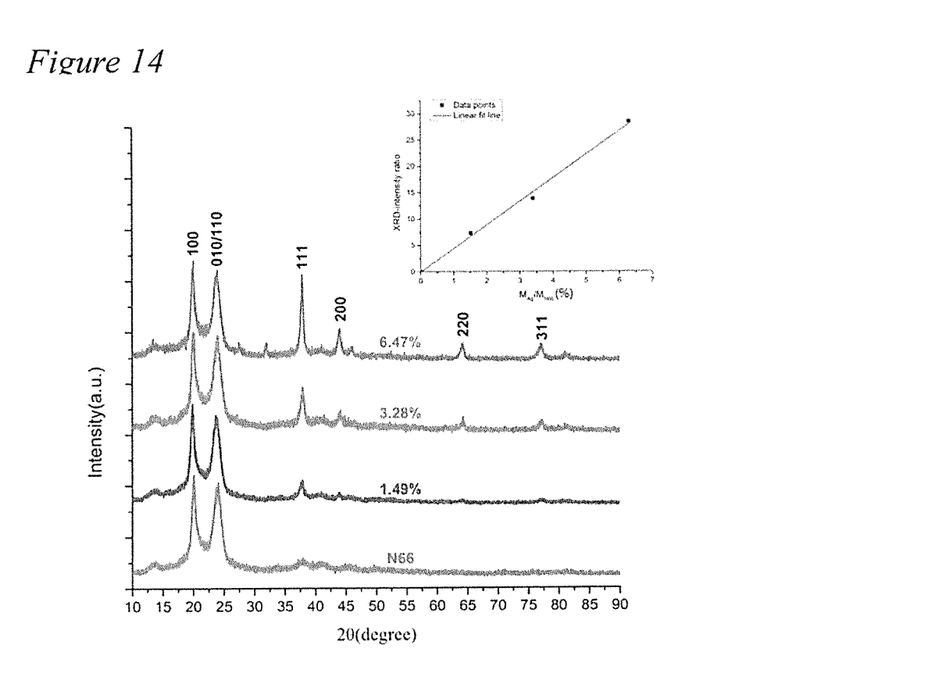
FIG. 14 depicts X-Ray Diffraction (XRD) spectra of AgNW filler/N66 composite particles of the present disclosure. The inset shows AgNW:N66 mass ratio versus AgNW:N66 XRD intensity ratio.

X-Ray diffraction (XRD) spectra of the prepared AgNW/N66 nanocomposite powders are acquired as given by FIG. 14. The two strong reflections at 2θ=20.1° and 24.0° are the (100) and (010,110) planes of N66α phase crystals, respectively (FIG. 4.9). The four peaks at 2θ=37.9°, 44.0°, 64.2° and 77.1° conform to (111), (200), (220) and (311) planes of bulk silver. All the four reflections are assigned to face-centered cubic (fcc) silver. In FIG. 14 all patterns are normalized by the intensity of the (100) peak.

Figure 15:
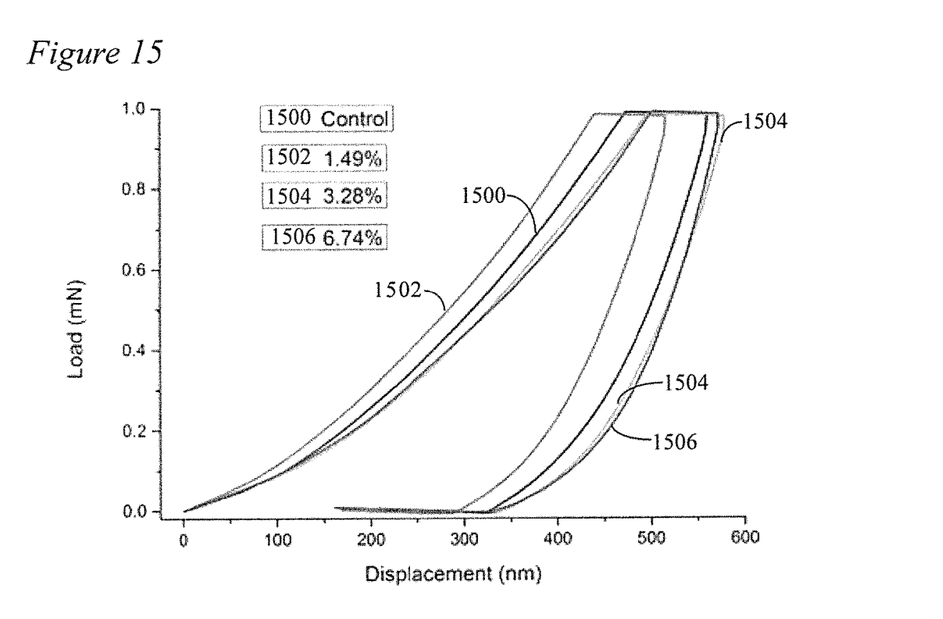
FIG. 15 depicts the Load-displacement curve of AgNW filler/N66 composites of the present disclosure.
Figure 16:
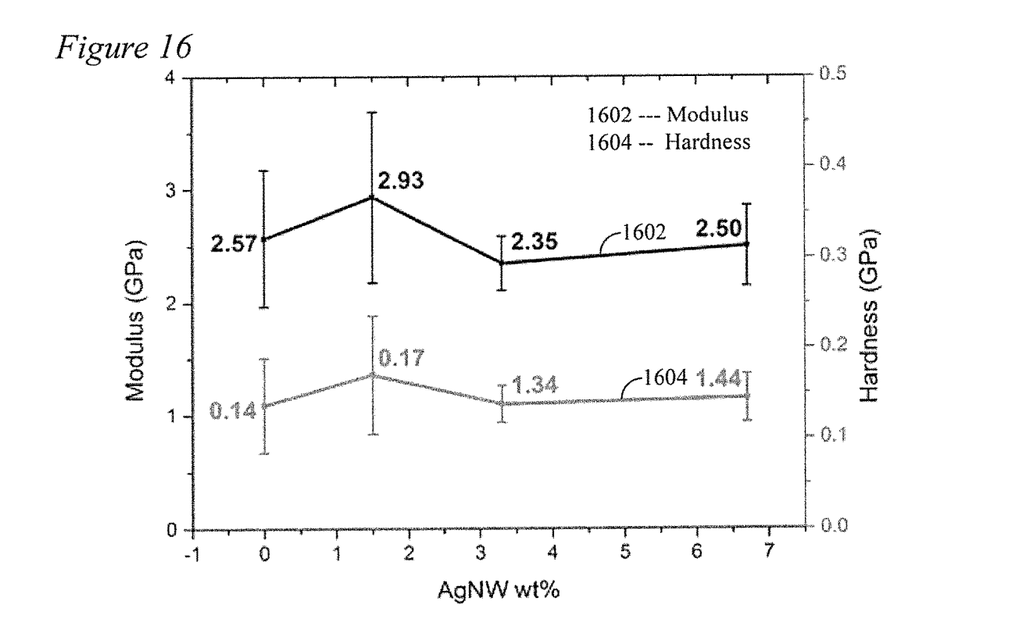
FIG. 16 depicts modulus and hardness of AgNW filler/N66 composite samples prepared according to the method of the present disclosure in Example 4.

Therefore, the materials characterization data corroborate that the present example of the disclosure process achieves synthesis of AgNW/N66 composites with well-dispersed and controllable amount of AgNW fillers. Mechanical properties of AgNW/N66 composites are characterized by nano-indentation. The load-displacement curves are shown in FIG. 15 wherein 1500 is a control; 1502 shows the load-displacement curve for 1.49% Ag; 1504 shows the curve for 3.28% Ag; and, 1506 shows the curve for 6.74% Ag. Modulus and hardness are given by FIG. 16 wherein curve 1602 shows modulus and curve 1604 shows hardness.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as if fully set out at this point.

\* \* \*

Thus, the present invention is well adapted to carry out the objects and attain the ends and advantages mentioned above as well as those inherent therein. While the inventive method has been described and illustrated herein by reference to certain preferred embodiments, various changes and further modifications, apart from those shown or suggested herein, may be made therein by those of ordinary skill in the art without departing from the spirit of the inventive concept, the scope of which is to be determined by the following claims.

What is claimed is:

1. A method for preparing a polymer composite having a uniform dispersion of microscale or nanoscale fillers, the method comprising:
   providing a first liquid monomer/solvent;
   dispersing said microscale or nanoscale fillers into the first liquid monomer/solvent to provide a first dispersion, wherein said microscale or nanoscale fillers are selected from the group consisting of: metals, metal oxides, semiconductors, chalcogenides and carbonaceous materials;
   providing a second liquid monomer/solvent;
   adding said second liquid monomer/solvent to said first dispersion; and,
   polymerizing at least one monomer from either said first liquid monomer/solvent or said second liquid monomer solvent to produce a polymer composite material having uniformly dispersed microscale or nanoscale fillers.

2. The method of claim 1, wherein said monomer is a diamine.

3. The method of claim 2 wherein said second liquid monomer/solvent is a diacid halide and wherein said polymerization step is a copolymerization of said first liquid monomer/solvent where said first liquid monomer/solvent is a diamine with said diacid halide.

4. A method for preparing a polymer composite of polyethylene terephthalate containing uniformly dispersed nanoparticles, the method comprising:
   dispersing nanoparticles in ethylene glycol, wherein said nanoparticles are selected from the group consisting of: metals, metal oxides, semiconductors, chalcogenides and carbonaceous materials;
   initiating polymerization of the ethylene glycol to polyethylene terephthalate by addition of terephthalic acid or dimethyl terephthalate to the ethylene glycol containing the dispersed nanoparticles;
   to produce a composite of polyethylene terephthalate containing uniformly dispersed nanoparticles within the polymer composite.

5. The method of claim 4, wherein said carbonaceous materials are selected from the group consisting of: graphene, graphene oxide, Fullerenes or carbon black.

6. A method for preparing a polymer composite having a uniform dispersion of nanoparticles, the method comprising:
   providing a first liquid monomer, wherein said first liquid monomer is non-polar;
   providing a second liquid monomer, wherein said second liquid monomer is polar;
   dispersing nanoparticles into said first liquid monomer to provide a first dispersion,
   wherein said nanoparticles are selected from the group consisting of: metals, metal oxides, semiconductors, chalcogenides and carbonaceous materials;
   generating microdroplets of said first dispersion in said second liquid monomer by mixing said first dispersion with said second liquid monomer;
   copolymerizing said first liquid monomer and said second liquid monomer to produce a polymer composite material having uniformly dispersed nanoparticles.

7. The method of claim 6, wherein said first monomer is a diamine dissolved in water.

8. The method of claim 6, wherein said second monomer is a diacid halide.

9. The method of claim 6, wherein said carbonaceous materials are selected from the group consisting of: graphene, graphene oxide, Fullerenes or carbon black.

10. A method for preparing a polymer composite having a uniform dispersion of nanoscale fillers, the method comprising:
    providing a first liquid monomer/solvent;
    dispersing said nanoscale fillers into the first liquid monomer/solvent to provide a first dispersion, wherein said nanoscale fillers are selected from the group consisting of: graphene, graphene oxide, Fullerenes or carbon black;
    providing a second liquid monomer/solvent;
    adding said second liquid monomer/solvent to said first dispersion; and,
    polymerizing at least one monomer from either said first liquid monomer/solvent or said second liquid monomer solvent to produce a polymer composite material having uniformly dispersed nanoscale fillers.

* * * * *

UNITED STATES PATENT AND TRADEMARK OFFICE
CERTIFICATE OF CORRECTION

PATENT NO. : 10,494,491 B2  
APPLICATION NO. : 15/543698  
DATED : December 3, 2019  
INVENTOR(S) : Ali Kaan Kalkan, Sriharsha Karumuri and Linqi Zhang Page 1 of 1

It is certified that error appears in the above-identified patent and that said Letters Patent is hereby corrected as shown below:

In the Claims

Column 13, Claim 2, Line 19, add "first liquid" between "said" and "monomer" therefore;

Column 13, Claim 2, Line 19, add "/solvent" after "monomer" therefore;

Column 14, Claim 7, Line 18, add "liquid" before "monomer" therefore;

Column 14, Claim 8, Line 20, add "liquid" before "monomer" therefore.

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*